United States Patent [19]

Mori et al.

[11] 4,099,326
[45] Jul. 11, 1978

[54] GARDEN SHEARS

[76] Inventors: Eizo Mori; Takao Mori, both of 11 of 473-banchi, Oaza Kuzuha, Hirakata-shi, Osaka-fu, Japan

[21] Appl. No.: 768,194

[22] Filed: Feb. 14, 1977

Related U.S. Application Data

[63] Continuation-in-part of Ser. No. 645,659, Dec. 31, 1975, abandoned.

[30] Foreign Application Priority Data

Jan. 7, 1975 [JP] Japan .................................. 50-4735
Apr. 30, 1975 [JP] Japan .................................. 50-53022

[51] Int. Cl.² ............................................. B26B 13/22
[52] U.S. Cl. .................................................... 30/135
[58] Field of Search ........................... 30/134, 135, 250

[56] References Cited

U.S. PATENT DOCUMENTS 572,644  12/1896  Lemm ..................... 30/134
614,167  11/1898  Gardella ................. 30/135

FOREIGN PATENT DOCUMENTS 1,125,722  7/1956  France ..................... 30/135
  336,997  2/1936  Italy ....................... 30/135

Primary Examiner—Jimmy C. Peters
Attorney, Agent, or Firm—Hall & Houghton

[57] ABSTRACT

A pair of garden shears are provided with the shears having laterally disposed branch retaining means for retaining a branch after it has been cut to prevent a scattering of the cut branches.

3 Claims, 4 Drawing Figures

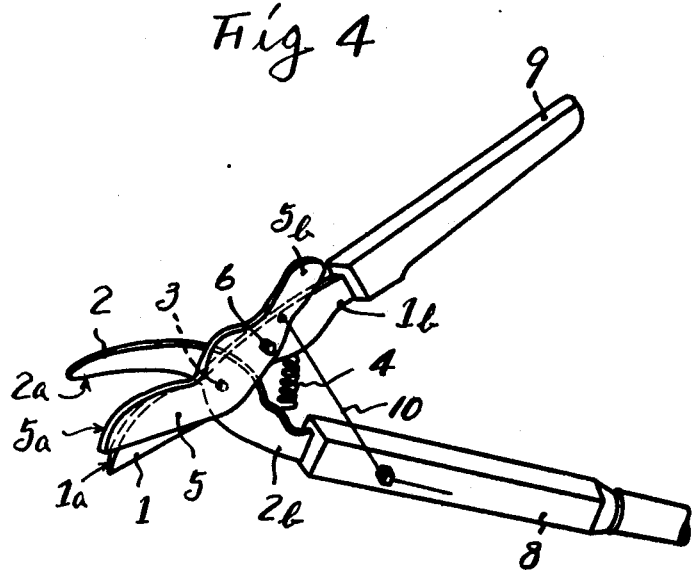

GARDEN SHEARS

RELATED APPLICATION

The present application is a continuation-in-part of application Ser. No. 645,659, filed Dec. 31, 1975, which is now abandoned.

BACKGROUND OF THE INVENTION (A) Field Of The Invention

The present invention relates to a pair of garden shears.

(B) Description Of The Prior Art

As is known, the conventional garden shears heretofore employed have been designed without any consideration being given whatsoever for simplifying the work of clearing away branches after they have been cut. Therefore, branches after being cut will scatter around the tree, and much time and labor will be required in the gathering or clearing them away. Moreover, in the case of pruning roadside trees, there is also the danger of the branches after being cut off falling down and striking pedestrians.

SUMMARY OF THE INVENTION

The present invention improves on the conventional garden shears so as to prevent branches from scattering after being cut and thereby simplifying the work of clearing them away. Therefore, according to the present invention, a pair of shears is provided with laterally disposed branch retaining means which will prevent branches from scattering after they have been cut.

The branch retaining means is designed to perform a branch retaining operation in association with the branch cutting action of the shears in such a manner that the branch after being cut will be firmly held by the branch retaining means and will not fall unless the operator releases it or transfers the cut branch to a place for collection and then releases it.

Another feature of the present invention is that the construction of the branch retaining means is very simple and the operation of the shears is otherwise the same as that of a conventional pair of shears.

BRIEF DESCRIPTION OF THE DRAWINGS

FIG. 4 is a schematic perspective view of another embodiment of a pair of garden shears made in accordance with the present invention.

DESCRIPTION OF THE PREFERRED EMBODIMENTS

Figure 1:
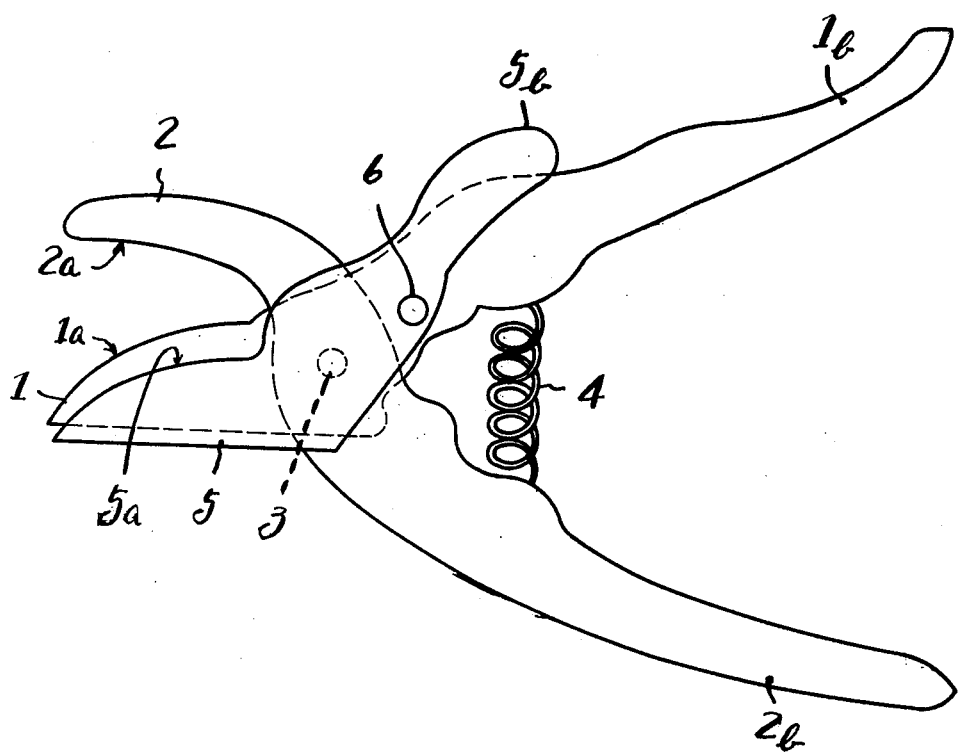
FIG. 1 is a plan view of one embodiment of a pair of garden shears made in accordance with the present invention.

Referring now to FIG. 1, the illustrative embodiment of the shears made in accordance with the present invention comprises a pair of shear elements 1 and 2 having cutting edges 1a and 2a respectively and extending in opposed relationship to one another. The shear elements 1 and 2 are pivoted to one another by a pivot element 3 positioned at a point rearwardly of the cutting edges 1a and 2a of the shear elements 1 and 2 to permit the opening and closing of the shear elements. The shear elements 1 and 2 are provided with integral grip portions 1b and 2b respectively, with the grip portions extending rearwardly therefrom. An opening force is applied to the shear elements 1 and 2 by means of a compression spring 4 spanning the distance between the grip portions 1b and 2b rearwardly of the pivot element 3.

Branch retaining means 5 are pivotally mounted to the shear element 1 by means of a pivot pin 6. The branch retaining means 5, as illustrated, comprises a single metal plate shaped in a plane form as shown in FIG. 1, and with a front edge portion 5a similar in shape to the actuating edge 1a of one shear element 1, and a rear end portion 5b shaped like a lever and adapted to receive the index finger of an operator. The branch retaining means 5 is pivotally mounted by means of a pivot pin 6 to the shear element 1 at a point rearwardly of the pivot pin 3. The branch retaining means 5 overlies the two shear elements 1 and 2 and its relationship to the latter is such that in the condition in which the branch retaining means 5 is attached to the shear element 1 by the pivot pin 6, the other shear element 2 is positioned between the shear element 1 and the branch retaining means 5. To assemble, the shear element 2 is placed on the shear element 1 and these elements are secured in pivoted relationship together by the pivot 3 and the branch retaining means 5 is thereafter placed on the assembly and attached to the shear element 1 by the pivot 6. The position of the pivot pin 6 is in the rear side of the pivot 3 and is such as not to interfere with the opening and closing operation of the shear elements 1 and 2.

Figure 2:
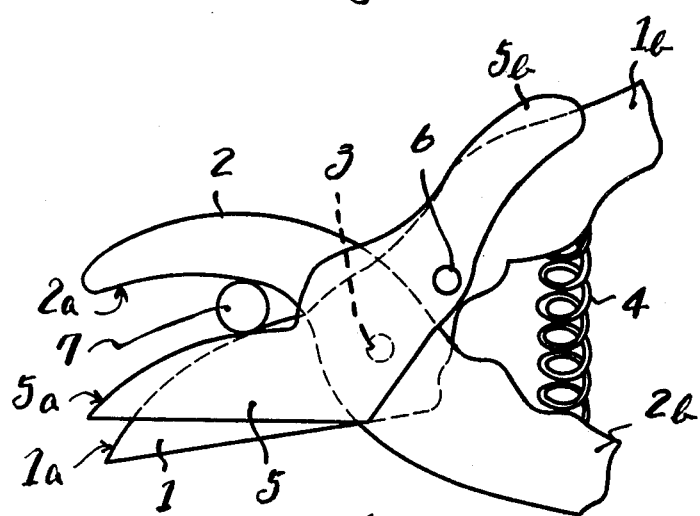
FIG. 2 is a fragmentary plan view of the embodiment shown in FIG. 1 illustrating the branch cutting initiating condition.
Figure 3:
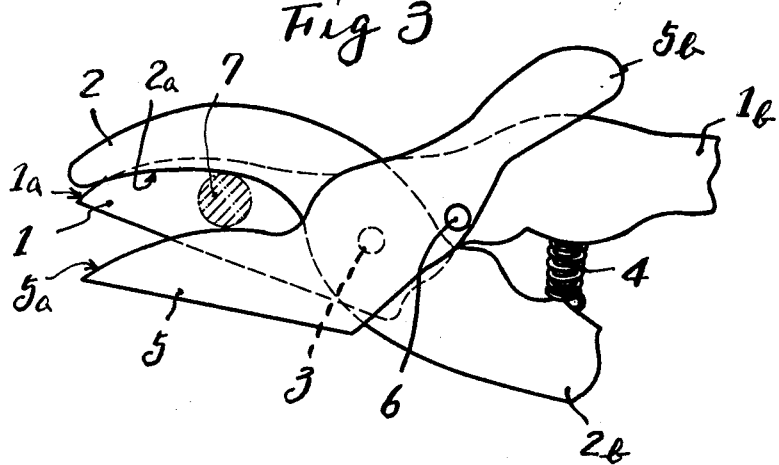
FIG. 3 is a plan view of the embodiment shown in FIG. 1 illustrating the branch retaining condition after a branch has been cut.

In operation, as shown in FIG. 2, the grip portion 2b of one shear element 2 and the rear end portion 5b of the branch retaining means 5 are given a force exerting in the closing direction so that the branch 7 is retained between one shear element 2 and the branch retaining means 5. Under this condition, the grip portion 2b of the shear element 2 and the rear end portion 5b of the branch retaining means 5 are further manipulated so that the branch 7 is retained more firmly by the branch retaining means 5 in cooperation with the shear element 2. At this time, the branch retaining means 5 and the shear element 2 are left as they are with the branch 7 positioned therebetween without any more movement in the closing direction. However, since the branch retaining means 5 and the other shear element 1 are connected together by the pivot pin 6, and further, the shear element 1 is pivotally connected together with the shear element 2 by a pivot element 3, the shear element 1 is moved in the closing direction about the pivot pin 6 by means of the aforementioned force exerted in the closing direction. That is, the rear end portion 5b of the branch retaining means 5 is moved in the closing direction using the portion thereof abutting against the branch 7 as a fulcrum. Thus, the rear end portion 1b of the other shear element 1 is moved in the closing direction about the pivot pin 6 so that, as shown in FIG. 3, the branch 7 is cut by the shear elements 1 and 2 and firmly retained by the shear element 2 and the branch retaining means 5. The embodiment shown in FIGS. 1 to 3 is characterized in that the cutting and retaining of the branch 7 is carried out by a force exerted in the closing direction on the rear end portion 5b of the branch retaining means 5 and the grip portion 2b of the shear element 2 cooperating with one another. In other words, this embodiment is characterized in that no operation of the other shear element 1 is required to achieve both the desired cutting and holding of the branch. Owing to these two characteristics, a firm retaining of the branch 7 upon being cut is assured to much simplify handling of the garden shears.

FIG. 4 illustrates another embodiment which is directed particularly to cut branches positioned at elevated points by means of a remote-controlled operation of the garden shears shown in FIG. 1. In this embodiment, a long handle 8 is attached to the grip portion 2b of the shear element 2 which cooperates with the branch retaining means 5. Fixedly secured to the rear end portion 5b of the branch retaining means 5 is one end of a handling wire 10 with the other end thereof being led through a guide provided at the forward portion of the long handle 8 and then to the rear end (not shown) of the handle 8. The rear end of the handle 8 is provided with a handling lever (not shown) to which the free end of the wire 10 is connected so that the handling wire may by pulled by manipulation of said handling lever (not shown) for having the branch retaining means 5 turned in the engaging or closing direction. Thus, this construction permits the same function as that achieved by the embodiment shown in FIG. 1.

We claim:

1. A pair of garden shears comprising a pair of elongated shear elements having complementary cutting portions at the forward end of each and having gripping means for actuating the shear elements at the opposite ends thereof, first pivot means spaced rearwardly of said cutting portions connecting said shear elements to one another in pivotal relationship for opening and closing the cutting portions of the shear elements, spring means spaced rearwardly of said pivot means connecting the shear elements to one another under compression to keep the cutting portions of the shear elements in a normal open state, branch retaining means of a length materially less than the length of each of said shear elements, second pivot means pivotally securing said branch retaining means to one of said shear elements, said second pivot means being positioned rearwardly of and in off-setting relationship to the first pivot means of the shear elements, said branch retaining means having a branch engaging portion at the forward end thereof and lying in superposed relationship with the cutting portion of the shear element to which the branch retaining means is pivoted, said branch portion being in aligned operating relationship with the cutting portion of the shear element, the opposite end of the branch retaining means having an operating portion located forward of the gripping means of each of said shear elements to insure the retention of a branch by the shears after a branch has been cut.

2. A pair of garden shears as set forth in claim 1, characterized in that the branch retaining means consists of a single member having a branch retaining portion at the front end thereof and the actuation means consisting of a finger-operable lever portion at the rear end thereof to actuate the branch retaining means.

3. A pair of garden shears in accordance with claim 1, which further includes a long handle secured to one end of the gripping means of the shear element in cooperative relationship with the branch retaining means, wire actuating means secured at one end to said branch retaining means at a point adjacent the rear portion of the branch retaining means, said wire actuating means connected intermediate its respective ends to a connecting pin mounted on the gripping means on which said long handle is secured, and the opposite end of said wire actuating means extending rearwardly towards the terminus of the long handle whereby the wire actuating means can be actuated from a remote point to engage the branch to be cut.

* * * * *